(12) United States Patent
Youm

(10) Patent No.: US 9,794,482 B2
(45) Date of Patent: Oct. 17, 2017

(54) ELECTRONIC APPARATUS, METHOD OF TRANSMITTING DATA ASYNCHRONOUSLY AND OPTICAL IMAGE STABILIZATION MODULE

(71) Applicant: SAMSUNG ELECTRO-MECHANICS CO., LTD., Suwon-si (KR)

(72) Inventor: Jung Eun Youm, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 15/066,156

(22) Filed: Mar. 10, 2016

(65) Prior Publication Data

US 2016/0294535 A1    Oct. 6, 2016

(30) Foreign Application Priority Data

Apr. 1, 2015    (KR) .................. 10-2015-0046308

(51) Int. Cl.
*H04N 5/232* (2006.01)
*G06F 17/30* (2006.01)

(52) U.S. Cl.
CPC ... *H04N 5/23248* (2013.01); *G06F 17/30489* (2013.01)

(58) Field of Classification Search
CPC ........... H04N 5/23248; H04N 1/00114; H04N 1/32443; H04N 2201/0029
USPC .................................................. 348/208.99
See application file for complete search history.

(56) References Cited

U.S. PATENT DOCUMENTS

| 2006/0209783 | A1* | 9/2006 | Jain ................... H04L 1/1812 370/349 |
| 2006/0294058 | A1* | 12/2006 | Zabback ........... G06F 17/30536 707/999.002 |
| 2010/0123787 | A1* | 5/2010 | Yamanaka ......... H04N 5/23248 348/208.4 |
| 2014/0022434 | A1* | 1/2014 | Morita ............... H04N 5/23209 348/333.04 |
| 2016/0182573 | A1* | 6/2016 | Longobardi ............ H04L 47/12 709/203 |

FOREIGN PATENT DOCUMENTS

| KR | 10-2005-0090190 A | 9/2005 |
| KR | 10-2006-0074819 A | 7/2006 |

* cited by examiner

*Primary Examiner* — Nhan T Tran
(74) *Attorney, Agent, or Firm* — NSIP Law

(57) ABSTRACT

Provided are an electronic apparatus in which a duplicate data transmission is prevented even if the data is asynchronously transmitted and received, a method of transmitting data asynchronously, and an optical image stabilization module. An electronic apparatus includes a control unit configured to request a data transmission according to a main clock signal, and a first circuit unit configured to transmit data corresponding to the data transmission request to the control unit, according to a first clock signal, wherein the first clock signal is asynchronous with the main clock signal, and the first circuit unit is further configured to set a flag during a period of the first clock signal in which the data transmission request is input to check for a duplicate data request.

14 Claims, 4 Drawing Sheets

ELECTRONIC APPARATUS, METHOD OF TRANSMITTING DATA ASYNCHRONOUSLY AND OPTICAL IMAGE STABILIZATION MODULE

CROSS-REFERENCE TO RELATED APPLICATION

This application claims the benefit under 35 USC §119(a) of Korean Patent Application No. 10-2015-0046308 filed on Apr. 1, 2015, with the Korean Intellectual Property Office, the entire disclosure of which is incorporated herein by reference for all purposes.

BACKGROUND

1. Field

The following description relates to an electronic apparatus from which data is transmitted and in which data is received, a method of transmitting data asynchronously, and an optical image stabilization module.

2. Description of Related Art

In general, an electronic apparatus includes various circuits.

Examples of such circuits may include a sensor module to detect internal or external electrical characteristics or physical characteristics, a control module to receive data from the sensor module to perform a calculation or control operation, and the like.

The data may be transmitted and received between the sensor module and the control module, but the data may be requested or transmitted in duplicate, due to a clock signal of the sensor module and a clock signal of the control module being different from each other.

Newly generating a clock signal by dividing an originally-provided clock signal, or calculating a timing of the clock signal to synchronize the clock signal may be used to prevent request or transmission of the data in duplicate. This may increase an area of a circuit and a separate circuit may be required, thereby increasing costs for manufacturing the electronic apparatus.

A method for newly setting a data protocol using the transmitted data, determining a starting point and ending point of the transmitted data by adding a specific bit, or determining the starting point and ending point of the transmitted data by periodically transmitting specific data may be used. But a data analysis circuit for determining is additionally required for this method, and a delay may be generated in a real time transmitting system to cause errors in an operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided an electronic apparatus in which a duplicate data transmission may be prevented even if data is asynchronously transmitted and received, a method of transmitting data asynchronously, and an optical image stabilization module.

In another general aspect there is provided an electronic apparatus including a control unit configured to request a data transmission according to a main clock signal, and a first circuit unit configured to transmit data corresponding to the data transmission request to the control unit, according to a first clock signal, wherein the first clock signal is asynchronous with the main clock signal, and the first circuit unit is further configured to set a flag during a period of the first clock signal in which the data transmission request is input to check for a duplicate data request.

The electronic apparatus may include a plurality of circuit units.

The first circuit unit may be configured to transmit a preset bit to the control unit, in response to the data transmission request corresponding to the duplicate data request.

The electronic apparatus may include a plurality of circuit units configured to transmit data corresponding to the data transmission request to the control unit according to a plurality of clock signals, each clock signal of the plurality of clock signals being asynchronous with the main clock signal, wherein the plurality of circuit units may be configured to set a flag during a period of a clock in which the data transmission request is input to check for a duplicate data request.

The plurality of clock signals input to each of the plurality of circuit units may be asynchronous with each other.

The plurality of clock signals input to each of the plurality of circuit units may be synchronized with each other.

At least one circuit unit of the plurality of circuit units may transmit a preset bit to the control unit, in response to the data transmission request from the control unit corresponding to the duplicate data request.

The first circuit unit may be configured to recognize the duplicate data request, in response to the data transmission request being received for a second time during the period in which the flag is set.

According to another general aspect there is provided an optical image stabilization module including a control unit configured to request a data transmission according to a main clock signal, and a sensor module configured to perform a sensing operation according to a first clock signal, and to transmit sensing data corresponding to the data transmission request to the control unit, wherein the first clock signal is asynchronous with the main clock signal, and the sensor module is further configured to set a flag during a period of the first clock signal in which the data transmission request is input to check for a duplicate data request.

The sensor module unit may transmit a preset bit to the control unit, in response to the data transmission request from the control unit corresponding to the duplicate data request.

The sensor module includes a sensor configured to detect characteristics in response to a request, a converter configured to performing analog-digital conversion for data detected by the sensor, and a transmitter configured to check for duplicate detection data converted by the converter, in response to the data transmission request of the control unit, and to transmit the checked detection data.

The transmitter may be further configured to store the converted data.

According to another general aspect there is provided, a method of transmitting data asynchronously including transmitting, by a control unit operated according to a main clock signal, a protocol for a data transmission, setting, by a circuit unit operated according to a first clock signal asynchronous with the main clock signal, a data effective section and performing a transmission check according to the protocol, setting, by the circuit unit, a flag in a period of the clock signal in which a data transmission request from the control unit is input, and checking for a duplicate data request based on the flag.

The method may include transmitting, by the circuit unit, a preset bit to the control unit, in response to the data transmission request from the control unit corresponding to the duplicate data request.

The method may include transmitting, by the circuit unit, data corresponding to the data transmission request, in response to the data transmission request not corresponding to the duplicate data request.

Other features and aspects will be apparent from the following detailed description, the drawings, and the claims.

Figure 1:
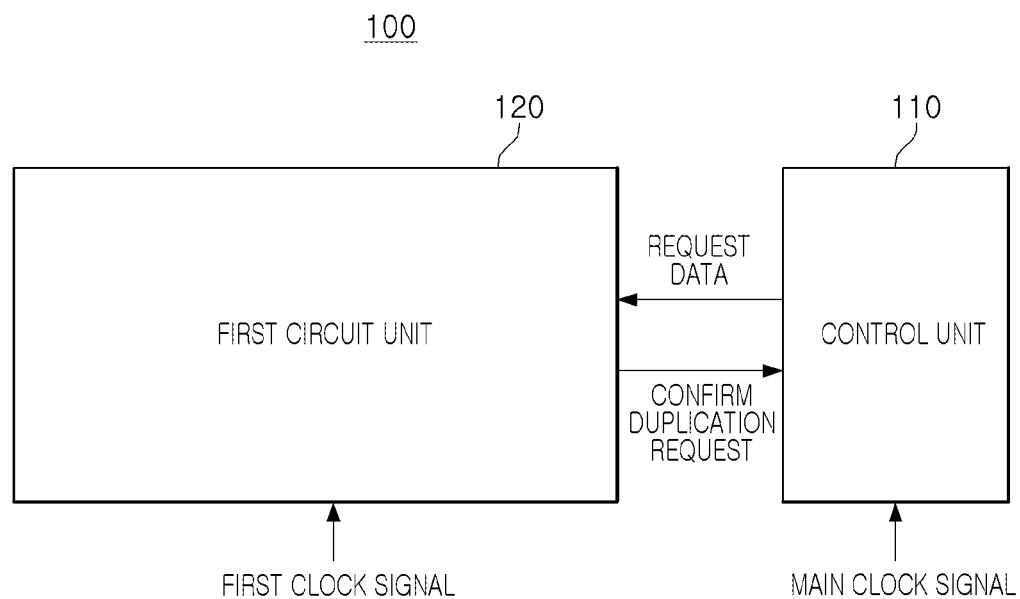
FIG. 1 is a diagram illustrating an example of an electronic apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise.

Throughout the drawings, for example, due to manufacturing techniques and/or tolerances, modifications of the shape shown may be estimated. Thus, the drawing figures should not be construed as being limited to the particular shapes of regions shown herein, but may include a change in shape results in manufacturing. The following embodiments may also be constituted by one or a combination thereof.

FIG. 1 is a diagram illustrating an example of an electronic apparatus.

Referring to FIG. 1, an electronic apparatus 100 may include a control unit 110 and a first circuit unit 120.

The control unit 110 may be operated according to a main clock signal having a preset frequency, and may perform various operations such as, for example, a data calculation, controlling based on received data.

The first circuit unit 120 may be operated according to a first clock signal, asynchronous with the main clock signal.

In an example, the first clock signal may have a frequency different from that of the main clock signal and may also have the same frequency as that of the main clock signal, but may also be asynchronous with the main clock signal.

The first circuit unit 120 may perform operations such as, for example, the first circuit unit 120 may detect physical or electrical characteristics of a detection object to store detected data. In another example, the first circuit unit 120 may perform a set operation and then store result data of the performed operation.

The first circuit unit 120 may request data transmission according to the above-mentioned operations from the control unit 110.

The control unit 110 and the first circuit unit 120 may be operated according to the main clock signal and the first clock signal, respectively, but the main clock signal and the first clock signal may be asynchronous with each other.

Figure 2:
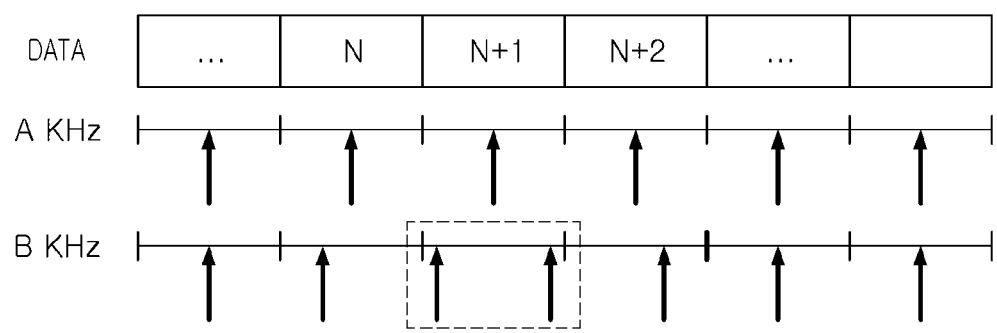
FIG. 2 is a diagram illustrating an example of a transmission duplication request of an asynchronous data transmission.

Thus, as illustrated in FIG. 2, a data transmission request may be duplicated in one clock of the first clock signal.

FIG. 2 is a diagram illustrating an example of a transmission duplication request of an asynchronous data transmission.

As illustrated in FIG. 2, for example, when the main clock signal has a frequency of A KHz and the first clock signal has a frequency of B KHz, upon requesting data stored in memories N, N+1, and N+2, the main clock signal and the first clock signal may be asynchronous with each other. Thereby, the data stored in one memory, such as, for example, N+1, may be requested twice for one period of the first clock signal.

The same data may be transmitted twice by the data transmission duplication request, described above. When the data is transmitted in real time, operation errors may also occur in the control unit 110 by a duplicate data transmission.

To prevent the duplicate data transmission and operation errors, if the first circuit unit 120 receives the data transmission request for each period of the first clock signal, the first circuit unit 120 may set a flag and may recognize when the data transmission request is received for a second time during the same period of the clock which the flag is set, as a duplication data transmission request.

Further, when the data transmission request is duplicated, the first circuit unit 120 may transmit a bit predefined between the first circuit unit 120 and the control unit 110 to the control unit 110 to inform the control unit 110 that the data transmission request is duplicated.

The data may be transmitted and received between the first circuit unit 120 and the control unit 110 in a wired or wireless scheme. In the case of the wired scheme, the data may be transmitted and received in a scheme such as, for example, a serial peripheral interface (SPI) bus, or an I Squared C (I2C) (meaning a two-wire interface).

Figure 3:
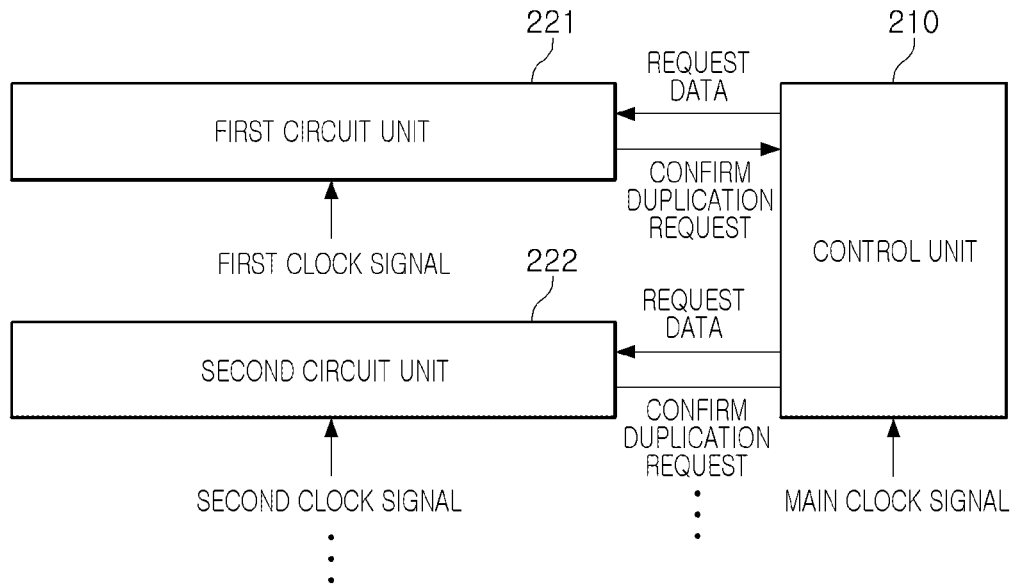
FIG. 3 is a diagram illustrating an example of an electronic apparatus.

FIG. 3 is a diagram illustrating an example of an electronic. Some of the components shown in FIG. 3 have been described with reference to FIGS. 1-2. The above description of FIGS. 1-2, is also applicable to FIG. 3, and is incorporated herein by reference. Thus, the above description may not be repeated here. Referring to FIG. 3, an electronic apparatus 200 may include a control unit 210 and a plurality of circuit units 221 and 222.

Similarly to the control unit 110 illustrated in FIG. 1, the control unit 210 may be operated according to a main clock signal having a preset frequency, and may perform various operations such as, for example, data calculation and controlling based on received data.

The plurality of circuit units 221 and 222 may include, for example, a first circuit unit 221 and a second circuit unit 222. The first circuit unit 221 may be operated according to a first clock signal having a preset frequency and the second circuit unit 222 may be operated according to a second clock signal having a preset frequency.

The first clock signal and the second clock signal may each be asynchronous with the main clock signal. In another example, the first clock signal and the second clock signal may also be synchronized with each other and may have the same frequency. In another example, the first clock signal and the second clock signal may be asynchronous with each other.

The first circuit unit 221 and the second circuit unit 222 may each receive a data transmission request from the control unit 210, and each of the first clock signal and the second clock signal may be asynchronous with the main clock signal.

If each of the first circuit unit 221 and the second circuit unit receives the data transmission request for each period of the first clock signal or the second clock signal, each of the first circuit unit 221 and the second circuit unit 222 may set a flag. When the data transmission request is re-received during the same period of the first clock signal or the second clock signal during which the flag is set, the first circuit unit 221 and the second circuit unit may recognize the data transmission request as a duplication data transmission request.

When the data transmission request is duplicated, the first circuit unit 221 and the second circuit unit 222 may each transmit a preset bit to the control unit 110 to inform the control unit 210 that the data transmission request is duplicated.

Figure 4:
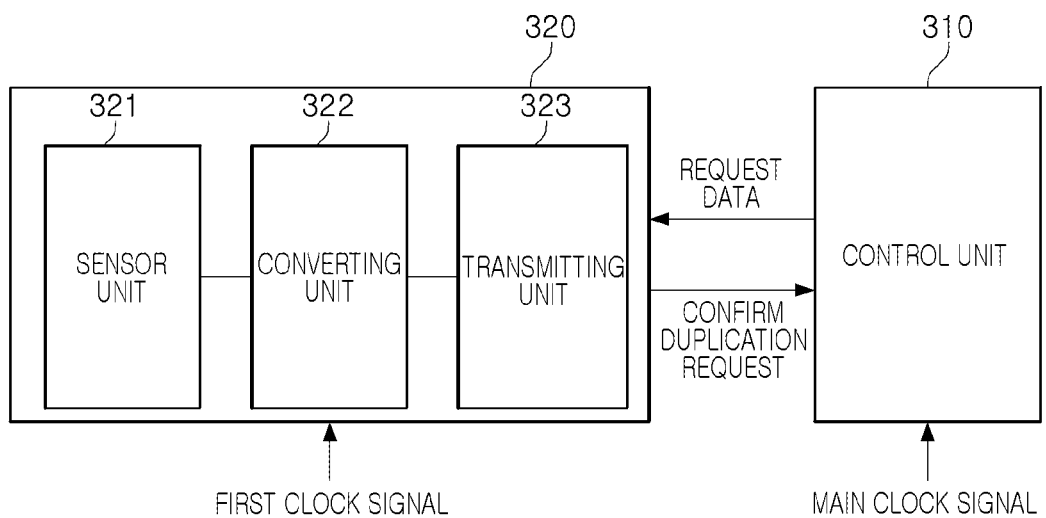
FIG. 4 is a diagram illustrating an example of an optical image stabilization module.

FIG. 4 is a diagram illustrating an example of an optical image stabilization module. Referring to FIG. 4, in an example, the electronic apparatus described above may be an optical image stabilization module.

An optical image stabilization module 300 according to an example may include a control unit 310 and a sensor module unit 320.

The control unit 310 may perform various operations such as, for example, image stabilization, lens position correction, based on detected data from the second module unit 320.

The sensor module unit 320 may include a sensor unit 321, a converting unit or a convertor 322, and a transmitting unit or a transmitter 323.

The sensor unit 321 may include a sensor, such as, for example, a gyro sensor, a hall sensor, and may detect a shaking of an electronic apparatus such as a camera or a cellular phone employing the optical image stabilization module 300.

The converting unit 322 may perform analog-digital conversion for data detected by the sensor unit 321. The transmitting unit 323 may transmit the converted data, in response to a data transmission request of the control unit 310. The transmitting unit 323 may store the converted data or may transmit the converted data in real time to the control unit 310 in response to the data transmission request of the control unit 310.

The control unit 310 and the sensor module unit 320 may need a clock signal when being operated. Thus, the control unit 310 may be operated according to a main clock signal and the sensor module unit 320 may be operated according to a first clock signal.

In an example, the main clock signal and the first clock signal may be asynchronous with each other. As a result, the transmitting unit 323 may confirm whether or not a data transmission request is duplicated during one period of the first clock signal and may transmit a set bit to inform the control unit 310 of the duplicate request.

The duplication of the data transmission request may be confirmed by flag setting, as described above. An operation of confirming whether or not the data transmission request is a duplicated request will be described below with reference to FIG. 5.

Figure 5:
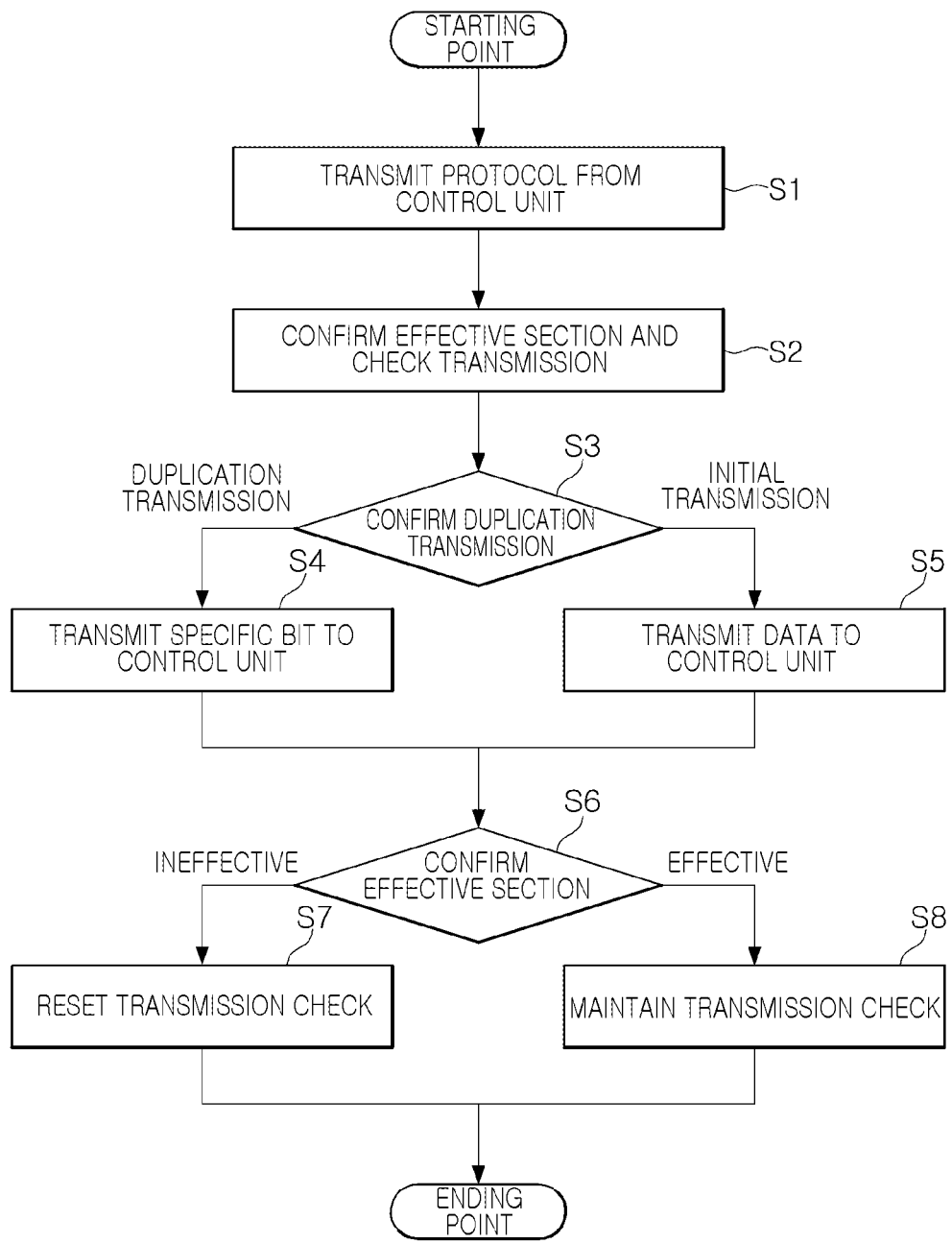
FIG. 5 is a diagram illustrating an example of a method of transmitting data asynchronously.

FIG. 5 is a diagram illustrating an example of a method of transmitting data asynchronously. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The above descriptions of FIGS. 1-4, is also applicable to FIG. 5, and is incorporated herein by reference. Thus, the above description may not be repeated here.

In S1, a protocol with respect to a data transmission may be set between the control unit 110 and the first circuit unit 120 of FIG. 1. In another example, in S1, a protocol with respect to a data transmission may be set between the control unit 210 and the first circuit unit 221 or the second circuit unit 222 of FIG. 3. In another example, in S1, a protocol with respect to a data transmission may be set between the control unit 310 and the sensor module unit 320 of FIG. 4.

In S2, the first circuit units 120 and 221, the second circuit unit 222, or the transmitting unit 323 of the sensor module unit 320 may confirm an effective section of data stored in a memory, and may check the data transmission.

In S3, the first circuit units 120 and 221, the second circuit unit 222, or the transmitting unit 323 of the sensor module unit 320 may determine whether or not the data transmission request from the control units 110, 210, and 310 is a duplicate request.

In S3, if the received data transmission request is a duplicate request, the first circuit units 120 and 221, the second circuit unit 222, or the transmitting unit 323 may transmit a preset specific bit to their respective control units 110, 210, and 310 when the data transmission request is a duplication request.

In S5, if the received data transmission request is not the duplicate request, but an initial transmission request during one period of the clock signal, the first circuit units 120 and 221, the second circuit unit 222, or the transmitting unit 323 of the sensor module unit 320 may transmit the corresponding data to their respective control units 110, 210, and 310.

In S6, it may be confirmed whether or not the data is in the effective section. In S7, if the data is in an ineffective section, a transmission check may be reset. In S8, if the data is in the effective section, the transmission check may be maintained.

Figure 6A:
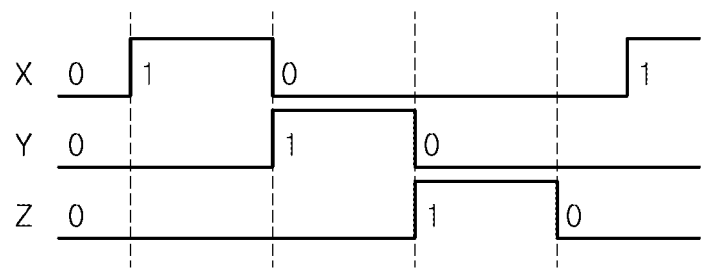
FIG. 6A is a diagram illustrating an example of a flag setting operation using the method of transmitting data asynchronously.
Figure 6B:
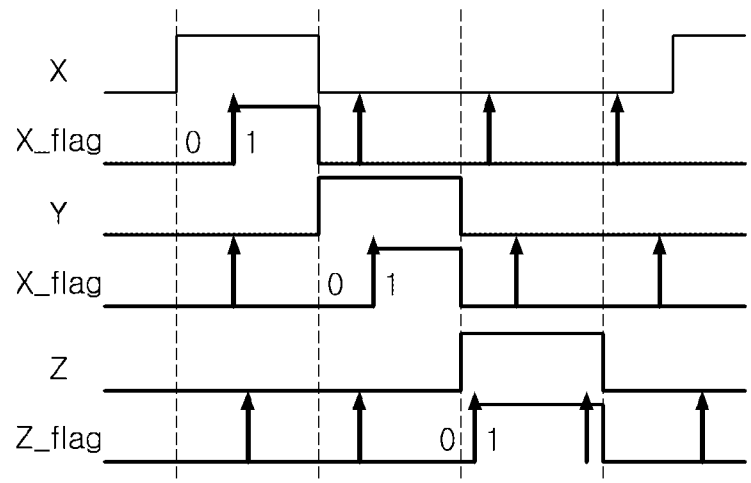
FIG. 6B is a diagram illustrating an example of a prevention of a data transmission duplication request by the flag setting of the method of transmitting data asynchronously.

FIG. 6A is a diagram illustrating an example of a flag setting operation using the method of transmitting data asynchronously. FIG. 6B is a diagram illustrating an example of a prevention of a data transmission duplication request by the flag setting of the method of transmitting data asynchronously.

As illustrated in FIG. 6A, for example, in an example where the sensor unit 321 of the sensor module unit 320 includes the gyro sensor, the transmitting unit 323 may include detection data of an X axis, an Y axis, and a Z axis and may store effective data in each memory.

Referring to FIG. 6B, when the data transmission request (arrow) is received during a period of a clock signal which data to be transmitted is effective, the flag may be set (in an illustrated example, set from '0' to '1'), thereby confirming the data transmission duplication request.

For example, in the detection data of the Z axis, the data transmission request (arrow) is received during the period of the clock signal in which the data to be transmitted is effective and the flag is set. If another data transmission request (arrow) is received during the same period of the clock signal, the preset specific bit may be transmitted to the requesting control units 110, 210, and 310.

The preset specific bit may be set to a value that minimally influences a data analysis, such as, for example, 8xFf, or 12xFF.

As described above, a separate determining circuit or a setting of a new protocol for a data transmission and reception may not be required, and the duplicate data transmission may be prevented even if the data is transmitted and received in the asynchronous scheme.

As set forth above, the separate determining circuit or the setting of the new protocol for the data transmission and reception may not be required, and the duplicate data transmission may be prevented.

The apparatuses, units, modules, devices, and other components illustrated that perform the operations described herein with respect to FIGS. 1, 3, and 4 are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 5 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic apparatus comprising:
   a control unit configured to request a data transmission according to a main clock signal; and
   a first circuit unit configured to transmit data corresponding to the data transmission request to the control unit, according to a first clock signal,
   wherein the first clock signal is asynchronous with the main clock signal, and the first circuit unit is further configured to set a flag during a period of the first clock signal in which the data transmission request is input to check for a duplicate data request.

2. The electronic apparatus of claim 1, wherein, the first circuit unit is further configured to transmit a preset bit to the control unit, in response to the data transmission request corresponding to the duplicate data request.

3. The electronic apparatus of claim 1, further comprising:
   a plurality of circuit units configured to transmit data corresponding to the data transmission request to the control unit according to a plurality of clock signals, each clock signal of the plurality of clock signals being asynchronous with the main clock signal;
   wherein the plurality of circuit units are further configured to set a flag during a period of a clock in which the data transmission request is input to check for a duplicate data request.

4. The electronic apparatus of claim 3, wherein the plurality of clock signals input to each of the plurality of circuit units are asynchronous with each other.

5. The electronic apparatus of claim 3, wherein the plurality of clock signals input to each of the plurality of circuit units are synchronized with each other.

6. The electronic apparatus of claim 4, wherein, at least one circuit unit of the plurality of circuit units transmits a preset bit to the control unit, in response to the data transmission request from the control unit corresponding to the duplicate data request.

7. The electronic apparatus of claim 1, wherein the first circuit unit is further configured to recognize the duplicate data request, in response to the data transmission request being received for a second time during the period in which the flag is set.

8. A method of transmitting data asynchronously comprising:
   transmitting, by a control unit operated according to a main clock signal, a protocol for a data transmission;
   setting, by a circuit unit operated according to a first clock signal asynchronous with the main clock signal, a data effective section and performing a transmission check according to the protocol;
   setting, by the circuit unit, a flag in a period of the clock signal in which a data transmission request from the control unit is input; and
   checking for a duplicate data request based on the flag.

9. The method of transmitting data asynchronously of claim 8, further comprising:
   transmitting, by the circuit unit, a preset bit to the control unit, in response to the data transmission request from the control unit corresponding to the duplicate data request.

10. The method of transmitting data asynchronously of claim 8, further comprising:
    transmitting, by the circuit unit, data corresponding to the data transmission request, in response to the data transmission request not corresponding to the duplicate data request.

11. An optical image stabilization module comprising:
    a control unit configured to request a data transmission according to a main clock signal; and
    a sensor module configured to perform a sensing operation according to a first clock signal, and to transmit sensing data corresponding to the data transmission request to the control unit;
    wherein the first clock signal is asynchronous with the main clock signal, and the sensor module is further configured to set a flag during a period of the first clock signal in which the data transmission request is input to check for a duplicate data request.

12. The optical image stabilization module of claim 11, wherein the sensor module is further configured to transmit a preset bit to the control unit, in response to the data transmission request from the control unit corresponding to the duplicate data request.

13. The optical image stabilization module of claim 11, wherein the sensor module comprises:
   a sensor configured to detect characteristics in response to a request;
   a converter configured to performing analog-digital conversion for data detected by the sensor; and
   a transmitter configured to check for duplicate detection data converted by the converter, in response to the data transmission request of the control unit, and to transmit the checked detection data.

14. The optical image stabilization module of claim 13, wherein the transmitter is further configured to store the converted data.

* * * * *